(12) United States Patent
Gray (10) Patent No.: US 8,172,077 B1
(45) Date of Patent: May 8, 2012

(54) PORTABLE WORKSTATION

(76) Inventor: Jack D. Gray, Ball Ground, GA (US)

( * ) Notice: Subject to any disclaimer, the term of this patent is extended or adjusted under 35 U.S.C. 154(b) by 0 days.

(21) Appl. No.: 13/038,292

(22) Filed: Mar. 1, 2011

(51) Int. Cl.
*F16M 11/00* (2006.01)
*B65D 85/00* (2006.01)

(52) U.S. Cl. .............. 206/45.24; 190/18 R; 190/107; 190/127; 248/146; 248/165; 248/166; 206/576

(58) Field of Classification Search .......... 190/11, 190/107, 124, 127, 18 R; 206/45.24, 372, 206/373, 577, 576; 248/146, 165, 163.1, 248/166
See application file for complete search history.

(56) References Cited

U.S. PATENT DOCUMENTS

| 1,283,832 | A | * | 11/1918 | McCarroll | 132/315 |
| 4,372,630 | A | | 2/1983 | Fuhri | |
| 4,702,029 | A | | 10/1987 | DeVaul | |
| 4,836,374 | A | | 6/1989 | Hutchins | |
| 5,366,071 | A | | 11/1994 | Laszlo | |
| 6,135,277 | A | * | 10/2000 | Armstrong | 206/314 |
| 6,241,090 | B1 | | 6/2001 | Kaplinsky | |
| 6,789,670 | B2 | | 9/2004 | Cooper | |
| 6,811,006 | B1 | * | 11/2004 | Mundle | 190/11 |
| 6,926,428 | B1 | | 8/2005 | Lee | |
| 7,497,328 | B2 | | 3/2009 | Tonelli | |
| 7,819,247 | B2 | * | 10/2010 | Gonzalez | 206/320 |
| 2002/0066630 | A1 | * | 6/2002 | Brown, Sr. | 190/11 |
| 2002/0092725 | A1 | * | 7/2002 | Brown | 190/11 |
| 2006/0289320 | A1 | | 12/2006 | Miller | |

* cited by examiner

*Primary Examiner* — Jacob K Ackun
(74) *Attorney, Agent, or Firm* — Jones IP Law, LLC; Dennis W. Jones (57) ABSTRACT

A portable container includes a first half-shell pivotally connected to a second half-shell to form at least one releasably sealed compartment, wherein each half-shell includes a substantially flat, rectangular portion having walls extending from each edge of the rectangular portion; an opening substantially centered in the first half-shell sized for a cylindrical rod attached to a tripod, the rod having a base portion larger than its extension portion; and a support assembly within the first half-shell having a substantially flat base portion sized to increase strength and rigidity and including a receptacle to the extension portion of the cylindrical rod, the receptacle and extension including corresponding fastener openings so that a fastener device secures the portable container to the cylindrical rod, whereby the portable container is supported by the base portion, the support assembly provides stability to the portable container, and the portable container is rotatable upon the rod.

19 Claims, 5 Drawing Sheets

PORTABLE WORKSTATION

CROSS-REFERENCE TO RELATED APPLICATIONS

Not Applicable

BACKGROUND

1. Field of Invention

This invention pertains to transportable workstations. More particularly, this invention pertains to a transportable workstation that is also a container for carrying tools or other useful articles.

2. Description of the Related Art

Carry cases that include separate half-shells compartments are commonly used for transporting tools of various types. These carry cases are typically blow molded from plastic to form rigid containers that are durable, lightweight, and easily transportable. Additionally, custom fitted compartments can easily be formed within the cases to fit the specific tool to be transported. Multiple compartments can also be formed within the case.

A common problem with carrying multiple tools is finding inserts or compartments to fit the particular group of tools that will be used in a specialized occupation. Another common problem is keeping track of a multitude of tools as they are removed from the case for use. It often happens that the carry case serves the purpose of transporting the tools to the site, but then is merely underfoot or otherwise in the way during the work to be performed. This can lead to loss of tools, loss of the case, or even a safety hazard if the case is continually in the way of the worker.

Another common need for workers is a temporary workstation at a work site. For jobs of shorter duration, it is often not practical to bring a large workstation, desk, or table to the site. The burden of carrying many of the available workstations to a worksite often offsets any benefit from having the workstation available. The added time involved with moving workstations from place to place, and the added complexity of setup can significantly reduce the amount of work that could otherwise be accomplished in a desired time frame.

BRIEF SUMMARY

According to one embodiment of the present invention, a portable container adapted for storage and transportation of tools and related articles includes (1) a first half-shell pivotally connected to a second half-shell to form at least one releasably sealed compartment, wherein each half-shell includes a substantially flat, substantially rectangular portion having walls extending from each edge of the rectangular portion, and wherein the first half-shell forms a base of the portable container, (2) an opening substantially centered in the first half-shell, the opening sized for an extension portion of a corresponding rod, the rod having a base portion with a periphery that is larger than a corresponding periphery of the extension so that the base of the rod forms a stop portion, and (3) a support assembly affixed to the rectangular portion within the first half-shell, the support assembly sized to increase strength and rigidity of the rectangular portion, the support assembly including a receptacle dimensioned to receive the extension portion of the rod, whereby the base of the portable container is supported by the stop portion and the support assembly provides stability to the portable container.

In one embodiment, the extension portion of the rod is cylindrical so that the portable container is rotatable upon the rod. In another embodiment, the portable container includes (1) at least one fastener opening in the receptacle, the fastener opening distal to the rectangular portion, and (2) at least one fastener opening in the extension portion distal to the base portion of the rod, so that a fastening device inserted through the corresponding fastener openings secures the portable container to the rod. In another embodiment, the rod is attached to a tripod so that the portable container is supported by the tripod and is rotatable upon the tripod.

In another embodiment, the portable container includes a first insert within the first half-shell, that includes at least one section that is a form-fitted opening. In another embodiment, the portable container includes a second insert within the second half-shell so that the second insert secures each tool within each section of the first insert when the second half-shell is closed upon the first half-shell.

In another embodiment, the support assembly includes a substantially flat base portion and an opening substantially centered within the flat base portion, so that the receptacle is affixed at the opening.

In another embodiment, the portable container includes a skid-resistant surface affixed to the rectangular portion outside of at least one half-shell.

According to another embodiment of the present invention, a portable workstation adapted for storage and accessibility of tools and related articles includes (1) a tripod having a centerpost and three legs, where the centerpost is adapted with a rod to extend the centerpost a specified length, wherein the rod includes a base portion and an extension portion, where the base portion has a periphery that is larger than a corresponding periphery of the extension portion so that the base portion of the rod serves as a stop portion, and (2) a container adapted for storage and transportation of tools and related articles, that includes (a) a first half-shell pivotally connected to a second half-shell to form at least one releasably sealed compartment, and each half-shell includes a substantially flat, substantially rectangular portion having walls extending from each edge of the rectangular portion, and the first half-shell forms a base of the container, (b) an opening substantially centered in the first half-shell and sized for the extension portion of the rod, and (c) a support assembly affixed to the rectangular portion within the first half-shell and sized to increase strength and rigidity of the rectangular portion, and further including a receptacle dimensioned to receive the extension portion of the rod, so that the base of the container is supported on the tripod by the stop portion of the rod and the support assembly provides stability to the container.

In another embodiment, the portable container includes a flap between the first insert and the second insert to form a tool compartment, and a computer compartment.

According to one embodiment of the present invention, a portable container adapted for storage and transportation of tools and related articles includes (1) a first half-shell pivotally connected to a second half-shell to form at least one releasably sealed compartment, wherein each half-shell includes a substantially flat, substantially rectangular portion with walls extending from each edge of the rectangular portion, and the first half-shell forms a base of the portable container, (2) an opening substantially centered in the first half-shell, sized for a cylindrical rod having a base portion and an extension portion, the extension portion including an extension fastener opening distal to the base portion, and the base portion with a circumference greater than the extension circumference so that the base portion of the rod serves as a stop portion, and (3) a support assembly affixed to the rectangular portion within the first half-shell, and including a substantially flat base portion sized to increase strength and rigidity of the rectangular portion, and further including a receptacle affixed to the substantially flat base portion and dimensioned to receive the extension portion of the rod, the receptacle also including a fastener opening corresponding to the extension fastener opening so that a fastener device secures the portable container to the cylindrical rod, so that the base of the portable container is supported by the stop portion and the support assembly provides stability to the portable container.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

A portable workstation that is also used for transporting tools or other useful articles is disclosed. The design and availability of workstations varies considerably. However, the need to easily access the needed tools while performing jobs of short duration at a job site is a commonly felt need. Further, the need to be able to easily transport the workstation while at the site without misplacing tools or having to dismantle the workstation is another commonly felt need. Toward this end, a workstation is provided that is easily movable by merely closing the lid and transporting the complete workstation assembly within the site. The closed lid also functions as a sturdy work surface or workspace.

Figure 1:
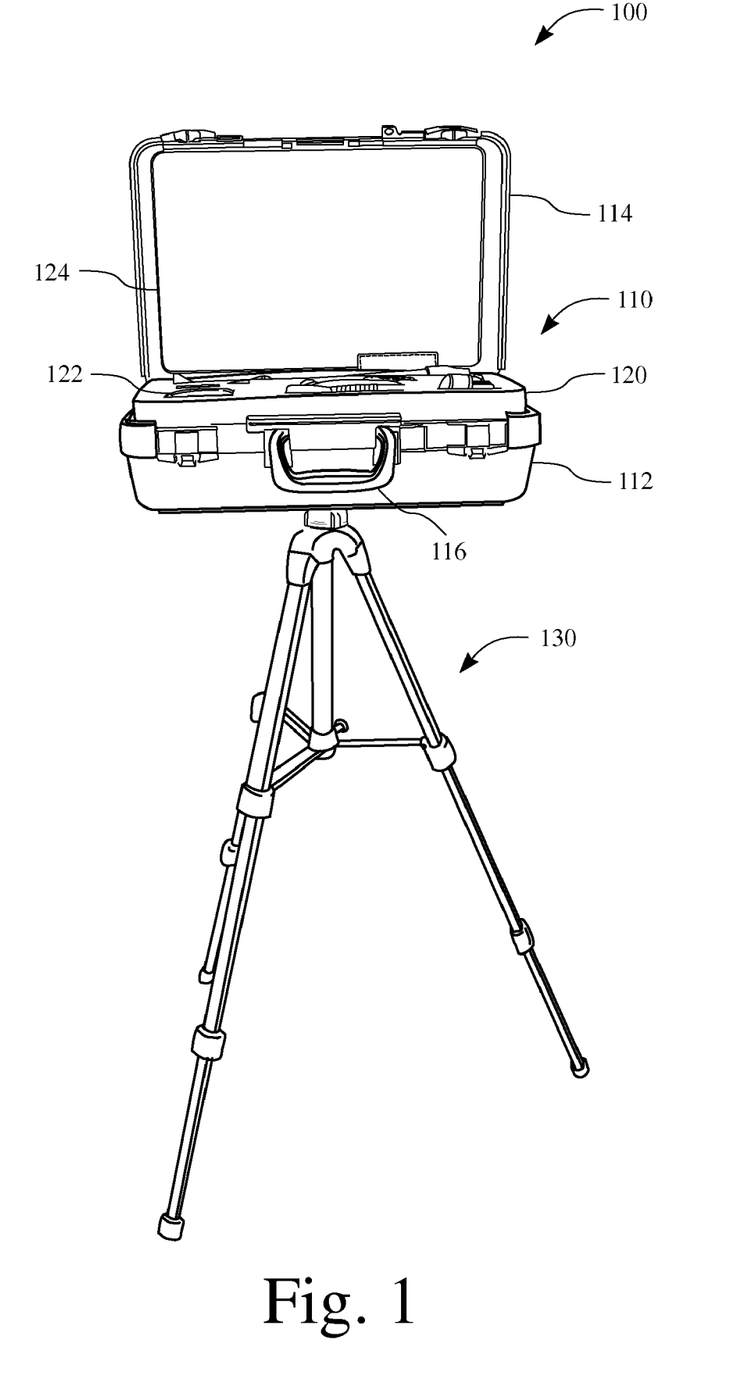
FIG. 1 is a perspective view illustrating one embodiment of a portable workstation.

FIG. 1 illustrates a perspective view of a workstation 100 that includes a carry case 110 and a tripod 130. In the illustrated embodiment, the carry case 110 includes a first half-shell 112, a second half-shell 114, a first insert 120, a second insert 124, and a handle 116. The carry case 110 is secured to a tripod 130 via a rod 300 (see FIG. 3) attached to the tripod 130. The workstation 100 is easily portable as an assembled unit. For those circumstances that require disassembly to move the workstation 100 within the site, the carry case 110 is easily removable from the tripod 130 to allow for a temporary reduction in the amount of occupied space.

A first insert 120 is situated within the first half-shell 112 and includes a plurality of sections 122 that are form-fitted openings for tools and/or other articles of use. A second insert 124 is situated within the second half-shell 114 so that tools are secured in position within the sections 122 of the first insert 120 when the carry case 110 is closed.

In the illustrated embodiment, the tripod 130 is of a type that is commonly used for cameras, camcorders, and the like. Such a tripod 130 includes a center post and three collapsible telescoping legs.

Many occupations, such as preparing insurance estimates in damaged buildings, require that an assortment of tools be readily accessible for the estimator. The damage present in such locations, due to fire or flooding for example, is often prohibitive to situating the necessary tools within the work area due to the amount of debris or other factors. The portable workstation 100 allows an estimator to secure the carry case 110 to a rod 300 (see FIG. 3) on the tripod 130.

In the illustrated embodiment, the carry case 110 includes an assortment of tools necessary for collecting measurements and other information necessary to prepare an insurance estimate for the cost of damages at a site. It will be appreciated by those of skill in the art, that various occupations requiring a varied assortment of tools within a location for a job of modest time duration will find use for such a portable workstation 100 via customizing the first insert 120 to the particular circumstances and needs.

The portable workstation 100 provides for minimal setup time so that the estimator spends more time performing actual work. If the estimator needs to move to another location within the worksite, the portable workstation 100 is easily movable by lifting the entire assembly from the upper portion of the tripod 130, or in one embodiment, by lifting the carry case 110, so that the tripod 130 moves with it.

Figure 2:
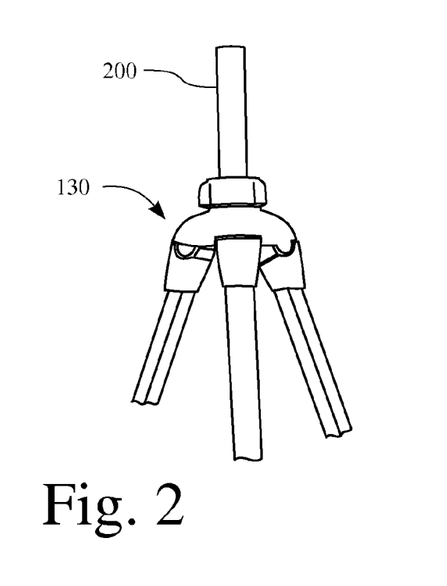
FIG. 2 is an exemplary tripod for use with a carry case in a portable workstation as in FIG. 1.

FIG. 2 is an exemplary tripod 130 for use with a carry case 110 in a portable workstation 100. The tripod 130 includes a post or shaft 200 that extends from the head of the tripod 130. In one embodiment, the shaft 200 is merely the centerpost of the tripod 130. In another embodiment, the shaft 200 is an attachment secured to a mount on the head of the tripod 130. Of course, the tripod 130 may include various type mounts or securing devices to which the shaft 200 may be secured. In other embodiments, the carry case 110 is secured to a portable stand such as a portable work stand, a portable laptop stand, or even to more traditional work tables or workstands.

Figure 3:
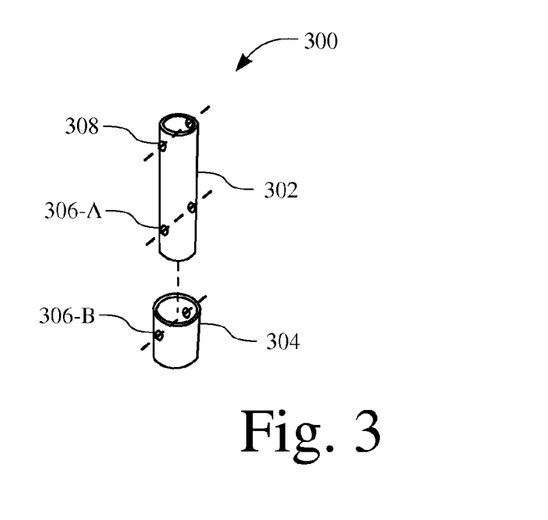
FIG. 3 is an exploded perspective view illustrating one embodiment for an rod for use with a carry case in a portable workstation.

FIG. 3 is an exploded perspective view illustrating one embodiment for a rod 300 for use with a carry case 110 in a workstation 100. The rod 300 includes an extension 302 that inserts into a base 304. The extension 302 includes holes 306-A that align with companion holes 306-B in the base 304. The holes 306 provide for securing the extension 302 to the base 304 via inserting a bolt or pin through the holes. Those of skill in the art will readily appreciate that the particular mechanism for securing the extension 302 to the base 304 is a design choice that does not impact the operability of the rod 300.

In one embodiment, the extension 302 and the base 304 of the rod 300 are formed from aluminum tubing. Those of skill in the art will readily appreciate that other materials may also be selected from which to form the extension 302 and the base 304 of the rod 300. The rod 300 is of sufficient size and length to extend into a receptacle of the carry case 110 while providing strength and stability to the workstation 100.

Together, the extension 302 and base 304 form a rod 300 that also serves as a stop on which the first half-shell 112 of the carry case 110 rests during use of the workstation 100. The cylindrical form of the rod 300 also allows the carry case 110 to rotate on the tripod 130. In this manner, the workstation 100 is never out of position merely due to an incorrect orientation within the worksite. As the user moves about the room, the carry case 110 is easily rotated on the tripod 130 without the need for continually repositioning the workstation 100 amongst the potentially cluttered workspace.

In an alternative embodiment, a rod 300 is machined as a single piece formed to fit over a shaft 200. The singular piece rod 300 includes an offset corresponding to the base 304 that functions as a stop for stabilizing the carry case 110 position with respect to the tripod 130.

Figure 4:
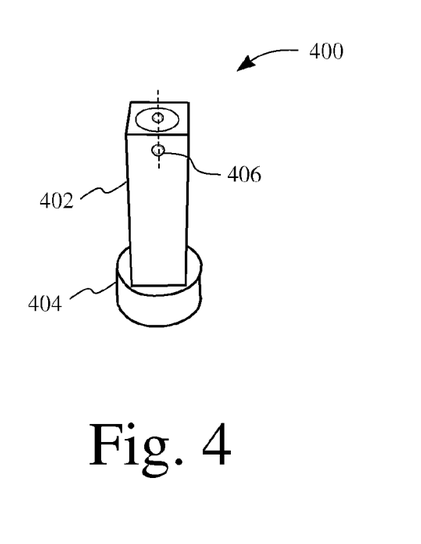
FIG. 4 is a perspective view illustrating another embodiment for a tripod rod for use with a carry case in a portable workstation.

FIG. 4 is a perspective view illustrating an alternative embodiment for a rectangular rod 400 for use with a carry case 110 in a portable workstation 100. In such an embodiment, the rectangular rod 400 includes a rectangular extension 402 and a circular base 404. The rectangular rod 400 is machined to fit over the shaft 200. Fastener holes 406 provide for securing the rectangular rod 400 to the carry case 110.

In one embodiment, the circular base 404 of the rectangular rod 400 is machined to include an internal thread adapted for the thumbscrew of a tripod mount. In another embodiment, the circular base 404 includes a nut for fastening to a thumbscrew. The rectangular extension 402 is machined to have four flat surfaces at essentially right angles to each immediately adjacent surface of the rectangular extension 402. The flat surfaces extend away from the circular base 404.

The rectangular rod 400 is typically machined from a single piece of tubing. In such a circumstance, the circular base 404 is of a generally round configuration and the rectangular extension 402 includes four flat surfaces. Each flat surface is generally perpendicular to the immediately adjacent surfaces. Of course, the circular base 404 can have other shapes as a matter of design choice.

The rectangular extension 402 is dimensioned as a generally square or rectangular shape that corresponds to the shape of the receptacle opening 606' (see FIG. 7) in the receptacle 604' of the mounting base 600 within the carry case 110. In this way, the rectangular extension 402 fits snugly within the receptacle 604 without being so tight as to cause difficulty when removing the carry case 110 from the tripod 130. In another embodiment, the rectangular extension 402 includes six flat surfaces in a generally hexagonal shape when viewed from the end distal to the circular base 404. Such an embodiment would correspond to a generally hexagonally shaped receptacle 120 on the mounting base 600 with necessary changes to the corresponding shell opening 1100 (see FIG. 11), the receptacle opening 606, and the first insert opening 1202 (see FIG. 12) to maintain consistency. It should be readily appreciated that any number of configurations can be chosen for the rectangular extension 402 and the corresponding openings of the carry case 110.

Figure 5:
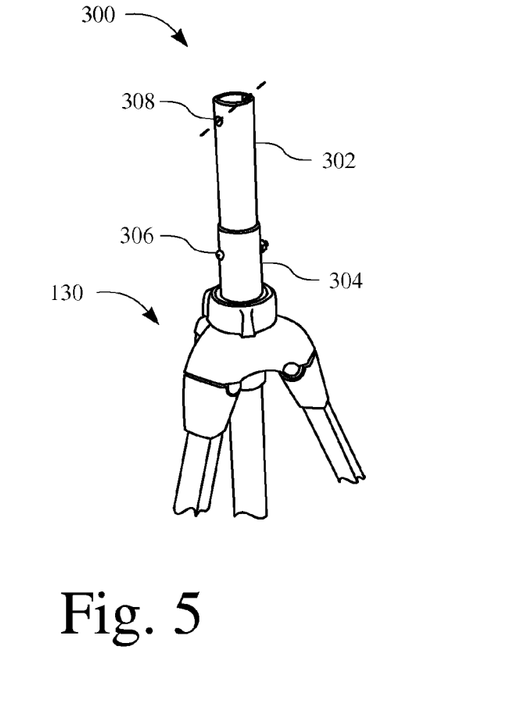
FIG. 5 is a perspective view illustrating one embodiment for an rod secured to a tripod.

FIG. 5 is a perspective view illustrating one embodiment for a rod 300 secured to a tripod 130. The rod 300 fits over the shaft 200 of the tripod 130. In the illustrated embodiment, a bolt extends through the holes 306 to secure the rod 300 to the tripod 130. In such an embodiment, a hole also extends through the shaft 200 of the tripod 130. Those of skill in the art will readily appreciate that other type fasteners may be used for securing the rod 300 to the tripod 130. For example, tap screws would extend through the holes 306 of the rod 300 and into the shaft 200.

In one embodiment, a fastener opening 308 is located in the extension 302 of rod 300 distal from the base 304. The fastener opening 308 includes two holes extending through opposite sides of the extension 302. The holes of the fastener opening 308 correspond to openings within the carry case 110. When the rod 300 is within the carry case 110, a fastener device, such as a pin or a bolt, is extendable through the fastener opening 308 of the extension 302 and the corresponding openings inside the carry case 110. In this way, the carry case 110 is secured to the tripod 130 in a manner that prevents the carry case 110 from being jarred loose while adding additional stability to the workstation 100.

In one embodiment, the rod 300 is made from aluminum type tubing. In such an embodiment, the rod 300 is lightweight and also provides sufficient strength and durability for a robust workstation 100. Of course, other materials may be used for fabrication of the rod 300 according to the required strength and weight of the carry case 110 for supporting tools within the workstation 100.

Figure 6:
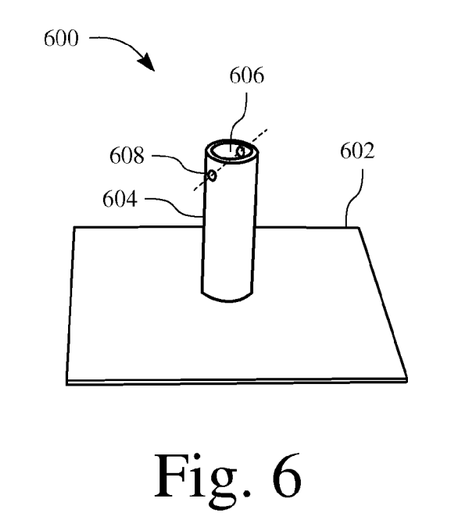
FIG. 6 is a perspective view illustrating one embodiment for a mounting base for a carry case.
Figure 7:
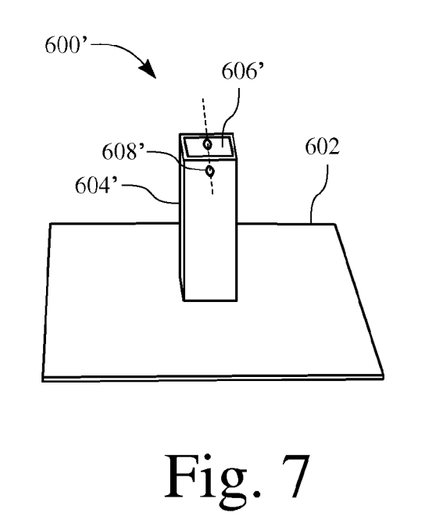
FIG. 7 is a perspective view illustrating another embodiment for a mounting base for a carry case.

FIG. 6 is a perspective view illustrating one embodiment for a mounting base 600 for a carry case 110. FIG. 7 is a perspective view illustrating an alternative embodiment for a mounting base 600' for a carry case 110. The mounting base 600 includes a base portion 602 and a receptacle 604. The alternative mounting base 600' includes a base portion 602 and a rectangular receptacle 604'. The receptacle 604 is joined to the mounting base 600 to form an opening 606 proximate the center of the mounting base 600. A receptacle opening 606 receives the rod 300. Similarly for the alternative embodiment, the receptacle opening 606' receives the rectangular rod 400.

The base portion 602 is typically a flat plate that provides added strength and rigidity to the outside wall of the first half-shell 112 of the carry case 110. In one embodiment, the base portion 602 is aluminum and is of sufficient thickness to provide the desired rigidity. A typical thickness for the base portion 602 is one-fourth inch aluminum. In some embodiments, the base portion 602 is one-eighth inches thick. Those of skill in the art will readily appreciate that the thickness of the base portion 602 is a design choice for the particular use of the carry case 110 and the portable workstation 100.

The receptacle 604 is of sufficient length that the rod 300 fits within the receptacle 604 to provide stability of the carry case 110 such that the carry case 110 is not vulnerable to tipping or wobbling while resting on the tripod 130.

In one embodiment, the receptacle 604 includes a receptacle fastener opening 608. The receptacle fastener opening 608 includes at least two holes opposite each other near the end of the receptacle 604 distal from the base portion 602. The two holes of the receptacle fastener opening correspond to optional holes in the rod 300 through which a fastener device is inserted to secure the carry case 110 to the tripod 130.

Figure 8:
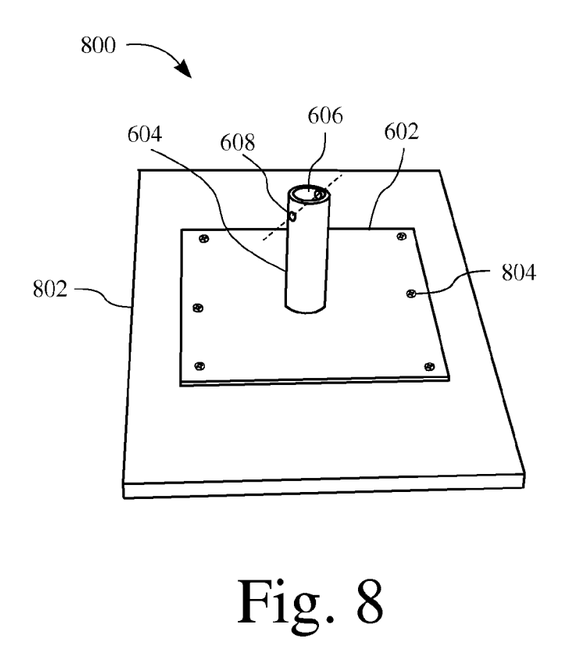
FIG. 8 is a perspective view illustrating one embodiment for a platform for securing a mounting base to a carry case.

FIG. 8 is a perspective view illustrating one embodiment for a support assembly or platform 800 for securing the mounting base 600. The base portion 602 of the mounting base 600 is secured to the platform 800 via fasteners 802 such as screws. Those of skill in the art will readily appreciate that many type fasteners may be used for securing the base portion 602 to the platform 800. The base portion 602 is situated generally central to the platform 800 so that the receptacle opening 606 aligns with an opening in the platform 800 and with an opening that is generally central in the first half-shell 112 of the carry case 110. The platform 800, with the mounting base 600, is dimensioned to fit within the length and width of the first half-shell 110.

Figure 9:
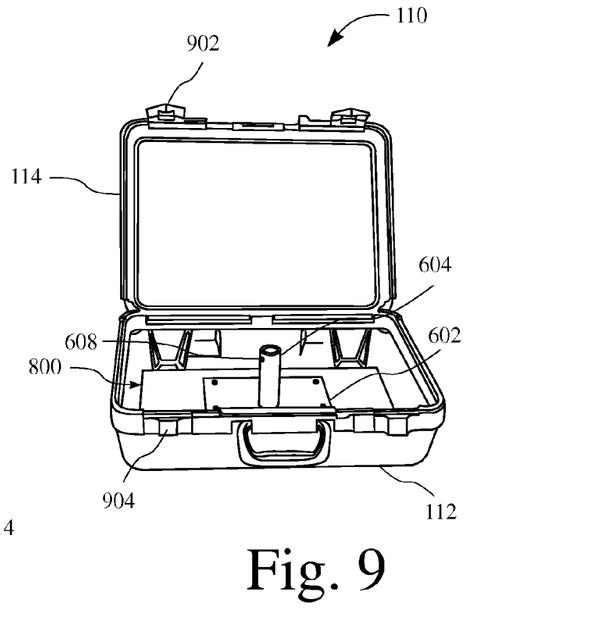
FIG. 9 is a perspective view illustrating one embodiment of a platform and mounting base secured inside a carry case.

FIG. 9 is a perspective view illustrating a carry case 110 with a platform 800 and mounting base 600 secured to the inside of the first half-shell 112. In the illustrated embodiment, the platform 800 is situated generally central within the first half-shell 112 and adjacent to the base portion of the first half-shell 112. In one embodiment, the platform 800 is secured to the first half-shell 112 via screws that are drilled through the first half-shell 112 (from the outside) and into the platform 800. In the illustrated embodiment, the platform 800 is made of plywood. The plywood is of sufficient thickness to provide for a desired strength and stability level of the workstation 100 while also providing reduced weight. It will be readily appreciated by those of skill in the art that other materials of varying thickness and weight may also be selected according to design preferences.

In one embodiment, the carrying case 110 is a hard or rigid case formed from blow molded plastic construction. The carrying case 110 includes a first half-shell 112 and a second half-shell 114. The first half-shell 112 and second half-shell 114 are pivotally connected. Such carrying cases are typically connected via a hinge mechanism, however any of a multitude of conventional hinge constructions may be included as are commonly used for joining a cover to the base of a blow molded plastic case, as will be readily appreciated by those having skill in the art.

In the illustrated embodiment, the first half-shell 112 is the base of the carry case 110 and the second half-shell 114 is the cover of the carry case 110. When joined via a hinge mechanism, the first half-shell 112 and the second half-shell 114 combine to form a compartment for storage of tools and such like within the carry case 110. In use, the first half-shell 112 is typically laid flat so that the second half-shell 114 is openable to provide access to the contents of the compartment within the carry case 110. In the closed position, latches 902 of the second half-shell 114 are fastened to projections 904 of the first half-shell 112 to close and secure the carry case 110. The first half-shell 112 includes a handle 116 for transporting the carry case 110 in the closed configuration.

Figure 10:
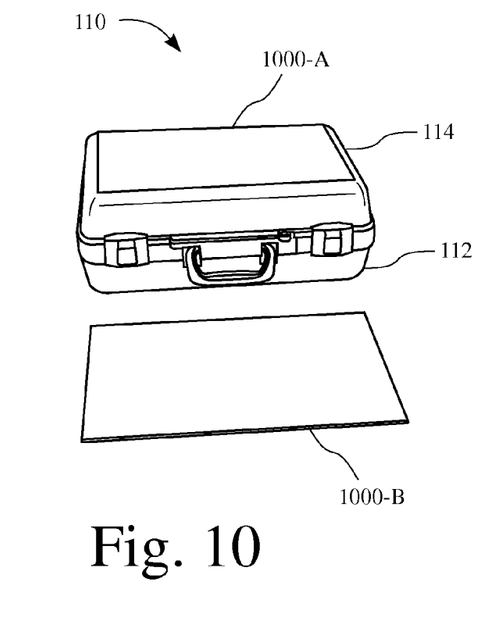
FIG. 10 is a perspective view illustrating one embodiment of a skid-resistant surface secured to a carry case.
Figure 11:
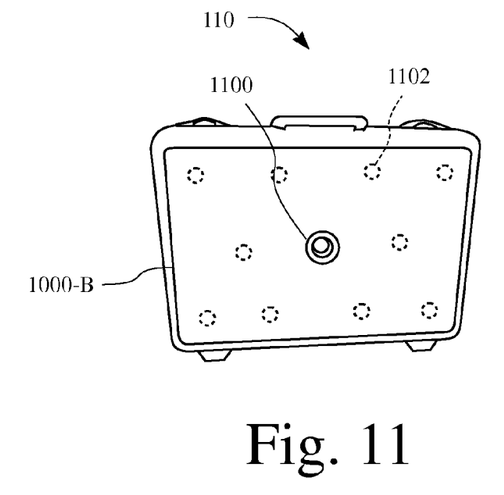
FIG. 11 is a perspective view illustrating one embodiment of an opening for supporting a carry case on a tripod.

FIG. 10 is a perspective view illustrating one embodiment of a skid-resistant surface 1000-A secured to a carry case 110. FIG. 11 is a perspective view illustrating one embodiment of a shell opening 1100 for supporting a carry case on a tripod. FIG. 11 also illustrates one embodiment of a skid-resistant surface 1000-B secured to the outside of the first half-shell 112 of the carry case 110. In the illustrated embodiment of FIG. 10, a skid-resistant surface 1000-A is affixed to the outside wall of the second half-shell 114. In one embodiment, the skid-resistant surface 1000-A is secured to the outside wall of the second half-shell 114 via an adhesive. Those of skill in the art will readily appreciate that many types of adhesive may be selected for affixing a skid-resistant surface 1000 to a half-shell of a carry case 110.

When the carry case 110 is in the closed configuration and secured to the tripod 130, the skid resistant surface 1000-A provides a worksurface for notepads, clipboards, and the like. In this way, the likelihood of items sliding or falling off the worksurface is reduced for those situations where the floor or ground of the worksite is so rough that the tripod 130 and/or workstation 100 is not entirely level or stable.

A second skid-resistant surface 1000-B is applied to the outside of the first half-shell 112. The second skid-resistant surface 1000-B provides added stability when the carrying case is situated on surfaces aside from a tripod 130. For example, the carrying case 110 can be placed on an automobile trunk or a truck tailgate with reduced chances of slippage. As an added benefit, the second skid-resistant surface 1000-B also covers the platform fasteners 1102 (e.g., screws or other fasteners) that are drilled through the first half-shell 112 to secure the platform 800.

The shell opening 1100 is generally centered within the base portion of the first half-shell 112. When the platform 800 and mounting base 602 is positioned within the first half-shell 112, the receptacle 120 is adjacent the shell opening 1100. The receptacle 604 includes a receptacle opening 606 within the receptacle 604. In one embodiment, the rod 300 of the tripod 130 protrudes through the shell opening 1100 of the first half-shell 112 and the receptacle opening 606 of the receptacle 120 of the carry case 110 so that the carry case 110 is supported by the tripod 130. The rod 300 protrudes into the receptacle 604 within the first half-shell 112 of the carry case 110.

In one embodiment, the receptacle 604 includes a receptacle fastener opening 608. The receptacle fastener opening 608 includes at least two holes opposite each other near the end of the receptacle 604 distal from the base portion 602. The two holes of the receptacle fastener opening correspond to optional holes in the rod 300 through which a fastener device is inserted to secure the carry case 110 to the tripod 130.

Figure 12:
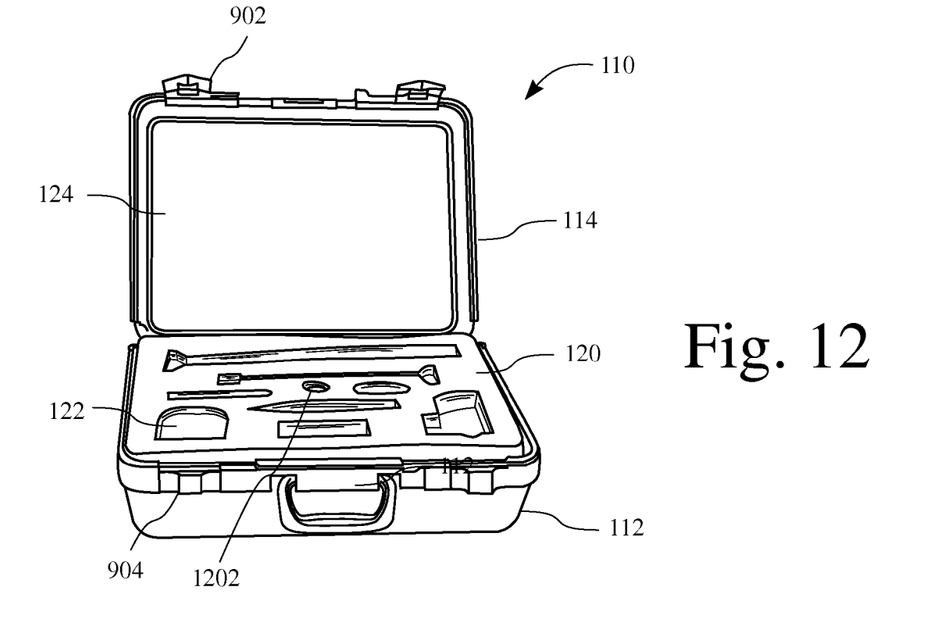
FIG. 12 is a perspective view illustrating one embodiment of an insert for placement of various articles within the carry case.

FIG. 12 is a perspective view illustrating one embodiment of a first insert 120 for placement of various tools and/or articles within the carry case 110. A first insert 120 is configured to fit within the first half-shell 112 of the carry case 110. The first insert 120 includes a first insert opening 1202 proximate the center of the first insert 120. The first insert 120 is positioned adjacent the mounting base 602 and within the compartment of the first half-shell 112. The first insert opening 1202 provides for the receptacle 604 to protrude through the first insert 120, and also stabilizes the position of the first insert 120 within the compartment of the first half-shell 112.

The first insert 120 includes sections 122 for placement of each respective tool within the carry case 110. The sections 122 are cut-out or pre-formed openings in the first insert 120 and are customized for the particular tools and/or articles of use. In this way storage is provided for the respective tools or articles in the closed configuration of the carry case 110, and easy accessibility is provided for the respective tools in the open configuration of the carry case 110. The sections 122 provide for placement of each tool in a particular location within the first insert 120 of the carry case 110. In this way, each tool is quickly located in its particular location so that time retrieving tools is minimized.

The illustrated example does not include specific tools but rather shows the openings in which tools are placed. Exemplary tools include a work light, an LED cliplight, wipes, a range finder, gloves, a utility knife, a card case, a tape measure, a camera, and utility pliers, among others. Of course, the particular sections 122 for tool shapes and designs vary according to user preferences of the desired tool set. The particular examples in the illustrated embodiment are shown as one exemplary design choice.

In the illustrated embodiment, the first insert 120 is a foam type insert as is commonly used for carry type cases. The first insert 120 can be any conventional foam material such as is commonly used for blow molded plastic cases. The foam material of the first insert 120 provides protection for those tools that are vulnerable to wear and tear from scratching while also allowing for ease in removing the tools from the carry case 110. The foam material also provides the user with the capability to customize the first insert 120 for specialized tools that may not otherwise be accounted for in conventional designs. Of course, the first insert 120 can also be made from more rigid materials or plastics.

A second insert 124 is configured to fit within the second half-shell 114 of the carry case 110. The second insert 124 is typically a foam type insert as is commonly used for such cases and can be any conventional foam material such as is commonly used for blow molded plastic cases. In the closed configuration, the second insert 124 provides for stability of the tools within the sections 122 of the first insert 120. In this way, each tool is maintained in its particular section 122 location during transport of the carry case 110, for example when the second half-shell 114 is closed to the first half-shell 112.

An insert such as the second insert 124 is typically fitted adjacent the lid portion of the second half-shell 114 within the recess area. The latches 902 are configured to close the carry case 110 by fastening to the projections 904 of the first half-shell 112, thus securing the second half-shell 114 to the first half-shell 112. In one embodiment, the hinge mechanism includes generally cylindrical hinge elements integrally formed to the second half-shell 114 for joining the second half-shell 114 to the first half-shell as noted above, and as is commonly known in the art.

Figure 13:
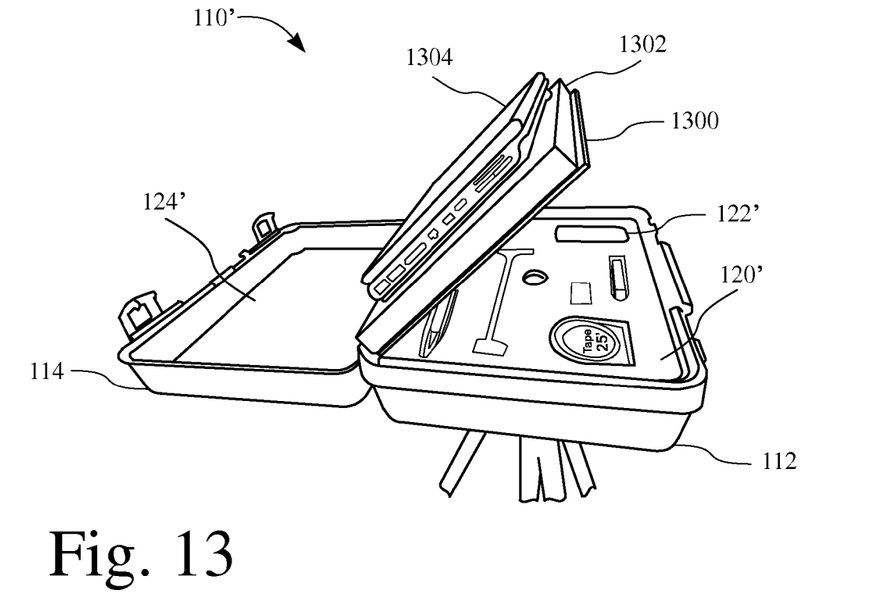
FIG. 13 is a perspective view of another embodiment of a carry case for use with a personal computer.

FIG. 13 is a perspective view of another embodiment of a carry case 100 for use with a personal computer. A carry case 110 substantially as described above also includes a computer compartment. The computer compartment corresponding to the second half-shell 114 is separated from the tool compartment corresponding to the first half-shell 112 by a computer flap 1300 attached to the carry case 110 near the hinge mechanism. The computer compartment is suitable for storage and use of a laptop personal computer or similar type device. The computer flap 1300 folds over the first insert 120' to reveal the computer compartment and folds over the second insert 124' to reveal the tools compartment. The first insert 120' and the second inert 124' are of less thickness than for a comparable carry case 110 that does not include a computer flap 1300.

A computer insert 1302 is attached to the computer flap 1300. The computer insert 1302 comprises any material that is suitable for providing stability and absorbing shock to protect a computer or other electronic device. A computer or other electronic device is placed on the computer insert 1302 and then the carry case 110 is closed to secure both the tools and the computer.

During use, the computer is operable from outside the case via removing the computer and placing it on a skid-resistant surface 1000 of the closed carry case 110, or via operating the computer atop the computer flap 1300 inside the open carry case 110.

In one exemplary use of the workstation 100, an insurance estimator arrives at a home that has been damaged initially by fire and then by the water used in extinguishing the fire. In such a circumstance, no electricity is generally available and lighting may be poor. There is generally a fair amount of debris on the floor. A portable workstation 100 provides a more stable work environment for such a circumstance.

The estimator sets the tripod 130 on the floor or ground area and stabilizes it. Then the carry case 110 is opened and placed on the tripod 130 by guiding the receptacle opening 606 over the extension 302 of the rod 300. (If fastener openings 308 are included in the rod 300, then a pin or other fastening device is inserted through the fastener openings 308 and the receptacle 604 to stabilize the portable workstation 100 even further.) Once the carry case 110 is secure to the tripod 130, the tools are readily accessible from the first insert 120 and the estimator begins gathering the measurements necessary for preparation of the insurance estimate of the repair costs.

The portable workstation 100 provides for minimal setup time so that the estimator spends more time performing actual work. If the estimator needs to move to another location within the worksite, the portable workstation 100 is easily movable by lifting the entire assembly from the upper portion of the tripod 130, or if a fastening device is included, by lifting the carry case 110, so that the tripod 130 moves with it.

While the present invention has been illustrated by description of several exemplary embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A portable container for storage and accessibility of tools and related articles, and for use in a portable workstation having a cylindrical rod with an extension portion and a base portion, wherein the base portion has a periphery that exceeds that of the extension portion, the portable container comprising:
a first half-shell pivotally connected to a second half-shell to form at least one releasably sealed compartment, wherein each half-shell includes a substantially flat, substantially rectangular portion having walls extending from each edge of the rectangular portion, and wherein the first half-shell forms a base of the portable container;
an opening substantially centered in the first half-shell, the opening sized for the extension portion of the cylindrical rod; and
a support assembly affixed to the rectangular portion within the first half-shell, the support assembly sized to increase strength and rigidity of the rectangular portion, the support assembly including a cylindrical receptacle corresponding to the opening and dimensioned to receive the extension portion of the cylindrical rod;
whereby the base of the portable container is supported by the base portion of the cylindrical rod and the portable container is rotatable upon the cylindrical rod.

2. The portable container of claim 1 further comprising:
at least one fastener opening in the cylindrical receptacle, the fastener opening distal to the rectangular portion; and
at least one fastener opening in the extension portion distal to the base portion of the cylindrical rod,
whereby a fastening device inserted through the corresponding fastener openings secures the portable container to the cylindrical rod.

3. The portable container of claim 2 wherein the cylindrical rod is attached to a tripod so that the portable container is supported by the tripod and is rotatable upon the tripod.

4. The portable container of claim 1, further comprising a first insert within the first half-shell, the first insert including at least one section, wherein each section is a form-fitted opening.

5. The portable container of claim 4, further comprising a second insert within the second half-shell so that the second insert secures each tool within each section of the first insert when the second half-shell is closed upon the first half-shell.

6. The portable container of claim 1 wherein the support assembly includes a substantially flat base portion, an opening substantially centered within the flat base portion, and wherein the cylindrical receptacle is affixed at the opening.

7. The portable container of claim 1 further comprising a skid-resistant surface affixed to the rectangular portion outside of at least one half-shell.

8. A portable workstation adapted for storage and accessibility of tools and related articles, the portable workstation comprising:
a tripod having a centerpost and three legs, the centerpost adapted with a rod to extend the centerpost a specified length, wherein the rod includes a base portion and an extension portion, the base portion having a periphery that is larger than a corresponding periphery of the extension portion so that the base portion of the rod serves as a stop portion; and
a container adapted for storage and transportation of tools and related articles, the container comprising:
a first half-shell pivotally connected to a second half-shell to form at least one releasably sealed compartment, wherein each half-shell includes a substantially flat, substantially rectangular portion having walls extending from each edge of the rectangular portion, and wherein the first half-shell forms a base of the container;
an opening substantially centered in the first half-shell, the opening sized for the extension portion of the rod; and
a support assembly affixed to the rectangular portion within the first half-shell, the support assembly sized to increase strength and rigidity of the rectangular portion, the support assembly including a receptacle dimensioned to receive the extension portion of the rod;
whereby the base of the container is supported on the tripod by the stop portion of the rod and the support assembly provides stability to the container.

9. The portable workstation of claim 8 wherein the extension portion of the rod is cylindrical so that the container is rotatable upon the tripod.

10. The portable workstation of claim 8, further comprising a first insert within the first half-shell, the first insert including at least one section, wherein each section is a form-fitted opening for a tool.

11. The portable workstation of claim 10, further comprising a second insert within the second half-shell so that the second insert secures each tool within each section of the first insert when the second half-shell is closed upon the first half-shell.

12. The portable container of claim 8 further comprising:
at least one fastener opening in the receptacle, the fastener opening distal to the rectangular portion; and
at least one fastener opening in the extension portion distal to the base portion of the rod,
whereby a fastening device inserted through the corresponding fastener openings secures the portable container to the tripod.

13. The portable workstation of claim 8 wherein the support assembly includes a substantially flat base portion, an opening substantially centered within the flat base portion, and wherein the receptacle is affixed at the opening.

14. The portable workstation of claim 8 further comprising a skid-resistant surface affixed to the rectangular portion outside of at least one half-shell.

15. The portable workstation of claim 11 further comprising a flap between the first insert and the second insert so that the flap and the first insert form a tool compartment, and the flap and the second insert form a computer compartment.

16. A portable container for storage and accessibility of tools and related articles, and for use in a portable workstation having a cylindrical rod with an extension portion and a base portion, wherein the base portion has a circumference that exceeds that of the extension portion and wherein the extension portion has an extension fastener opening distal to the base portion, the portable container comprising:
a first half-shell pivotally connected to a second half-shell to form at least one releasably sealed compartment, wherein each half-shell includes a substantially flat, substantially rectangular portion having walls extending from each edge of the rectangular portion, and wherein the first half-shell forms a base of the portable container;
an opening substantially centered in the first half-shell, the opening sized for the extension portion of the cylindrical rod; and
a support assembly affixed to the rectangular portion within the first half-shell, the support assembly including a substantially flat base portion sized to increase strength and rigidity of the rectangular portion, the support assembly further including a cylindrical receptacle affixed to the substantially flat base portion and dimensioned to receive the extension portion of the cylindrical rod, the cylindrical receptacle including a receptacle fastener opening corresponding to the extension fastener opening so that a fastener device provides for securing the portable container to the cylindrical rod;
whereby the base of the portable container is supported by the step base portion of the cylindrical rod and the portable container is rotatable upon the cylindrical rod.

17. The portable container of claim 16 wherein the cylindrical rod is attached to a tripod so that the portable container is supported by the tripod and is rotatable upon the tripod.

18. The portable container of claim 16, further comprising a first insert within the first half-shell, the first insert including at least one section, wherein each section is a form-fitted opening for a tool.

19. The portable container of claim 16, further comprising a second insert within the second half-shell so that the second insert secures each tool within each section of the first insert when the second half-shell is closed upon the first half-shell.

* * * * *